United States Patent
Laitinen et al.

(10) Patent No.: US 11,374,766 B2
(45) Date of Patent: Jun. 28, 2022

(54) DEVICES AND METHODS FOR KEY ATTESTATION WITH MULTIPLE DEVICE CERTIFICATES

(71) Applicant: Huawei Technologies Co., Ltd., Shenzhen (CN)

(72) Inventors: Pekka Laitinen, Helsinki (FI); Qiming Li, Helsinki (FI); Sampo Sovio, Helsinki (FI); Gang Lian, Helsinki (FI); Zhihua Shan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 16/638,291

(22) PCT Filed: Aug. 11, 2017

(86) PCT No.: PCT/EP2017/070407
§ 371 (c)(1),
(2) Date: Feb. 11, 2020

(87) PCT Pub. No.: WO2019/029817
PCT Pub. Date: Feb. 14, 2019

(65) Prior Publication Data
US 2020/0186357 A1 Jun. 11, 2020

(51) Int. Cl.
*H04L 9/32* (2006.01)
*H04L 9/06* (2006.01)
(Continued)

(52) U.S. Cl.
CPC .............. *H04L 9/3242* (2013.01); *G06F 9/54* (2013.01); *H04L 9/0643* (2013.01);
(Continued)

(58) Field of Classification Search
CPC ... H04L 9/3242; H04L 9/0643; H04L 9/0825; H04L 9/3263; H04L 9/3271;
(Continued)

(56) References Cited

U.S. PATENT DOCUMENTS

| 2014/0258733 A1 | 9/2014 | Scott-Nash |
| 2016/0086172 A1* | 3/2016 | Kamal ............... G06Q 20/3227 705/71 |

(Continued)

OTHER PUBLICATIONS

"Hardware-backed KeyStore," Retreived from:https://source.android.com/security/keystore/ on Apr. 28, 2020, 7 pages.
(Continued)

*Primary Examiner* — Nelson S. Giddins
*Assistant Examiner* — Lydia L Noel
(74) *Attorney, Agent, or Firm* — Conley Rose, P.C.

(57) ABSTRACT

A device with key attestation features comprises an operating system stored in its memory, the operating system comprising a secure environment including a trusted application, and two or more device certificates, each associated with a device key pair, stored in the memory of the device. The trusted application is configured to handle key pair generation requests and key pair attestation requests to read an indication of a preferred device certificate. An attestation certificate that is generated in response to the key pair attestation request is then signed using one of the two or more device certificates with its associated device key pair based on the indication of a preferred device certificate.

20 Claims, 4 Drawing Sheets

(51) Int. Cl.
  *H04L 9/08* (2006.01)
  *G06F 9/54* (2006.01)

(52) U.S. Cl.
  CPC .......... *H04L 9/0825* (2013.01); *H04L 9/3263* (2013.01); *H04L 9/3271* (2013.01)

(58) Field of Classification Search
  CPC ....... H04L 9/3268; G06F 9/54; G06F 21/602; G06F 21/64; G06F 21/57
  See application file for complete search history.

(56) References Cited

U.S. PATENT DOCUMENTS

2018/0262344 A1* 9/2018 Broumas .................. H04L 9/30
2019/0238342 A1* 8/2019 Lian ...................... H04L 9/0894

OTHER PUBLICATIONS

"KeyChain—Android Developers," Retreived from: https://developer.android.com/reference/android/security/KeyChain.html#isBoundKeyAlgorithm%28java.lang.String%29 on Apr. 28, 2020, 22 pages.
"KeyGenParameterSpec—Android Developers," Retreived from: https://developer.android.com/reference/android/security/keystore/KeyGenParameterSpec.html on Apr. 28, 2020, 27 pages.
"Secure an Android Device" Retreived from:https://source.android.com/security/ on Apr. 28, 2020, 7 pages.
"Verifying hardware-backed key pairs with Key Attestation—Android Developers" Retreived from: https://developer.android.com/training/articles/security-key-attestation on Apr. 28, 2020, 18 pages.
"Web Authentication: An API for accessing Public Key Credentials," XP055461219, W3C Working Draft, May 5, 2017, 74 pages.
"Key Attestation-Android Developers," XP055461277, Jul. 16, 2017, 10 pages.
XP055461288 KeyGenParameterSpec.Builder—Android Developers, Jul. 14, 2 017,18 pages.

* cited by examiner

DEVICES AND METHODS FOR KEY ATTESTATION WITH MULTIPLE DEVICE CERTIFICATES

CROSS-REFERENCE TO RELATED APPLICATIONS

This application is a U.S. National Stage of International Patent Application No. PCT/EP2017/070407 filed on Aug. 11, 2017, which is hereby incorporated by reference in its entirety.

TECHNICAL FIELD

The present application relates to the field of encryption and key generation, and more particularly to key attestation.

BACKGROUND

Modern electronic devices often have a possibility to perform key attestation on keys that have been generated onboard the device. The key may be protected by trusted hardware, for example in a Trusted Execution Environment (TEE). The key attestation may take form of an attestation certificate where the subject public key info is a public key part of the generated key pair, and where there is an extension describing the properties of the key pair in question. The attestation certificate in turn can be signed by a device certificate that is enrolled to the device during manufacturing.

At present, when key pairs are generated and key attestation is required, the mechanism used to sign an attestation certificate is to set a challenge as one of the parameters of the key pair generation. The challenge parameter is typically generated by the party that is requesting the key generation with an attestation certificate.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The inventors have found that it can be beneficial to configure a device with more than one device certificate. In such case indicating which device certificate should be used for signing the attestation certificate may be challenging in state of the art solutions.

Hence, it is an object of the present invention to provide a device with improved key pair attestation functionality.

Another object of the present invention is to provide methods for key pair attestation and for selecting a device certificate used in key pair attestation.

The foregoing and other objects are achieved by the features of the independent claims. Further implementation forms are apparent from the dependent claims, the description and the figures.

According to a first aspect a device is presented. The device may be a mobile device, for example a mobile device that has key attestation functionality. The device comprises: a processor and a memory, an operating system stored in the memory, the operating system comprising a secure environment including a trusted application, and two or more device certificates, each associated with a device key pair, stored in the memory. When the operating system is run on the processor, the trusted application is configured to: receive a key pair generation request, generate a key pair in response to the key pair generation request, receive a key pair attestation request with an indication of a preferred device certificate, generate an attestation certificate in response to the key pair attestation request, and sign the attestation certificate using one of the two or more device certificates with its associated device key pair based on the indication of a preferred device certificate.

The device certificates and their associated key pairs may be stored in the device after manufacture. The device key pairs can be generated in a secure environment such as a Hardware Security Module (HSM) or a Trusted Execution Environment (TEE) when the device is assembled, and the device certificates associated with the device key pairs are enrolled from a certification authority (CA) and can be securely injected in the device during device manufacturing.

The operating system may comprise other applications and application programming interfaces used in normal operation of the device, and the trusted application may be a Keymaster trusted application configured to sign key attestation certificates. The device of the first aspect and implementations thereof provide a device with multiple (two or more) device certificates for signing key attestations. Aspects of the present invention also provide a mechanism of indication which device certificate should be used to sign the attestation.

In an implementation of the device according to the first aspect, the device further comprises an application stored in the memory. The application is configured to send to the operating system the key pair generation request and the key pair attestation request with an indication of a preferred device certificate. The trusted application is configured to receive the key pair generation request and the attestation request with the indication of the preferred device certificate from the application.

The application may comprise application logic configured to generate the key pair generation and attestation requests. The indication of a preferred device certificate may relate to a specific certificate or a general certificate class such as a "vendor certificate". The indication may also include more than one preferred device certificate.

This allows an application to request key generation with e.g. a predetermined selection of a device certificate.

In a further implementation form according to the previous implementation, the key pair attestation request sent by the application comprises a challenge message which includes a prefix indicating a preferred device certificate.

The challenge message may include a string naming a brand name as a prefix indicating the specific brand-issued device certificate, or simply "vendor" as a prefix indicating a vendor-issued device certificate.

In a further possible implementation form alternative to the previous implementation of the first aspect, the key pair attestation request sent by the application comprises a challenge message, and the operating system comprises an application configured to add a prefix indicating a preferred device certificate to the challenge message.

The application in the operating system may be a service application configured to add prefixes to incoming challenge messages. In a further example, adding a prefix to the challenge message according to this implementation may override the previously assigned preferred device certificate, if the device certificate already had a prefix with such indication.

In this implementation, the device certificate selection is shifted to the preference of the operating system rather than an application running separately on the device. The application comprised in the operating system may add more than one preferred device certificate to the challenge message. The challenge message then proceeds to the trusted application in the secure environment.

In a further implementation form according to the first aspect, the challenge message also includes a cryptographic hash function or a message authentication code confirming that the challenge message has a prefix indicating a preferred device certificate. When the operating system is run on the processor, the trusted application is configured to verify the cryptographic hash function or the message authentication code, and, if the verification is successful, sign the attestation certificate using one of the two or more device certificates with its associated device key pair based on the challenge message prefix indicating a preferred device certificate.

The hash function or message authentication can reduce the chance of an incorrect selection of the device certificate.

In alternative implementations, the key pair generation request and the key pair attestation request may be sent to the trusted application by an external application, for example over a network.

In the implementations above, the attestation certificate may be sent back to the application separately. This can be done when the application requests the attestation certificate after the key pair has been successfully generated.

In a further implementation form according to the first aspect, the device comprises a stack of application programming interfaces, (API-s) configured to generate an indication of a preferred device certificate, and add the indication of the preferred device certificate to the key pair attestation request before it is received by the trusted application.

In this implementation, API calls are added to all layers of security indicating the preferred device certificate. This implementation does not require sending of a separate challenge message to the trusted application, since the key generation and attestation can be required through API calls.

In a further implementation form according to the first aspect, the device key pair comprises a public key bound to the associated device certificate, and a private key available only to the trusted application.

The private key of the device key pair may be stored in the secure environment after being injected into the device during manufacture.

In a further implementation form according to the first aspect, the memory comprises a secure segment accessible only to the trusted application; and wherein the private key of the device key pair is stored in the secure segment of the memory.

In further implementation form according to the first aspect, the processor is operable in a secure mode. When the operating system is run on the processor, the operating system is configured to initiate the secure mode of the processor and execute the trusted application to generate and sign the attestation certificate.

In a further possible implementation, the processor has access to the secure segment of the memory only in the secure mode.

In a further implementation form according to the first aspect, the two or more device certificates comprise certificates selected from the group of: vendor specific certificates, operating system specific certificates, default certificate, and generic vendor certificate.

The vendor specific certificates may include certificates tied to the manufacturer of the device. Generic vendor certificate may be identified by a generic reference such as the word "vendor". The operating system specific certificate may have a reference to the name of the operating system. The default certificate is the one used when no preferred device certificate is indicated, or when an unavailable device certificate is preferred.

In a further implementation form according to the first aspect, the operating system is a mobile operating system based on the Linux kernel.

Android (Android is a trademark of Google Inc.) is an example of an operating system based on the Linux kernel. In Android 7 and later, the key attestation mechanism is available to provide an attestation that the corresponding key pair is indeed protected by hardware. This allows to enable the selection of the device certificate without changing the existing Android APIs.

According to a second aspect a method of attestation of a key pair by a trusted application stored in a secure environment of an operating system is presented. The method comprises the following operations: receiving a key pair generation request, generating a key pair in response to the key pair generation request, receiving a key pair attestation request with an indication of a preferred device certificate, and generating an attestation certificate in response to the key pair attestation request and checking availability of the preferred device certificate. If the preferred device certificate is available, the method also comprises signing the attestation certificate using the preferred device certificate with its associated device key pair. If the preferred device certificate is unavailable, the method comprises signing the attestation certificate using a default device certificate with its associated device key pair.

The method according to the second aspect may be carried out by a trusted application stored in the Trusted Execution Environment (TEE) of an Android operating system.

In a possible implementation of the method according to the second aspect, the method comprises receiving a challenge message as part of the key pair attestation request, wherein the challenge message includes a prefix indicating a preferred device certificate.

In a further possible implementation form of the second aspect, the challenge message also includes a cryptographic hash function or a message authentication code confirming that the challenge message has a prefix indicating a preferred device certificate. The method further comprises verifying the cryptographic hash function or the message authentication code. If the verification is successful, the method continues by checking availability of the preferred device certificate indicated in the prefix, and if the verification is unsuccessful, the method comprises signing the attestation certificate using a default device certificate with its associated device key pair.

In a further implementation form according to the second aspect, the method comprises initiating a secure mode of operation prior to generating the attestation certificate.

The secure mode of operation of the processor can be activated to provide access to a secure memory segment needed to generate and/or sign the key pair attestation.

According to a third aspect a method of indicating a preferred device certificate by an application is provided. The method comprises: creating a key pair generation request, creating a key pair attestation request comprising a challenge message, adding a prefix to the challenge message, wherein the prefix comprises an indication of a preferred device certificate, and sending the key pair generation request together with the key pair attestation request to a trusted application stored in a secure environment of an operating system. The method according to the third aspect can be carried out by an application comprised in a device like the devices of the first aspect and its implementations. The method allows creating a request that can be received and recognized by the trusted application stored in a secure environment such as the TEE and comprising two or more device certificates to sign the attestation.

In a possible implementation of the method according to the third aspect, the method comprises adding to the challenge message a cryptographic hash function or a message authentication code confirming that the challenge message has a prefix comprising an indication of a preferred device certificate.

According to a fourth aspect, a computer program is presented. The computer program comprises program code configured to perform a method according to any one of the implementations of the second and third aspects, when the computer program is executed on a computer.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

In the following description, embodiments of a device and methods for key attestation are disclosed.

A concept underlying the present disclosure is that a secure trusted application of an operating system may have two or more device certificates that can be used for signing key pair attestations. The two or more different device certificates may indicate different security levels when key pair attestations are signed by these certificates. The indication of different security levels may refer to different levels of security of device key pair and certificate injection, or to different levels of protection of the device key pair in the device itself. The former levels of security may vary between manufacturers and their injection processes, and the latter security levels may vary based on the type of protection such as—protected only by the TEE, additionally protected by a secure element etc. These security levels may be indicated in a device certificate chain of information, or certification practice statement documents. Thus, when a key pair attestation request is sent to the trusted application, it may carry an indication of which device certificate should be used. This indication can be part of a challenge parameter in the request. The indication can be given in several ways, including but not limited to: providing an Application Programming Interface (API) stack supporting an indication from the application, or embedding the indication into the challenge parameter at various stages to indicate which device certificate should be used.

Figure 1:
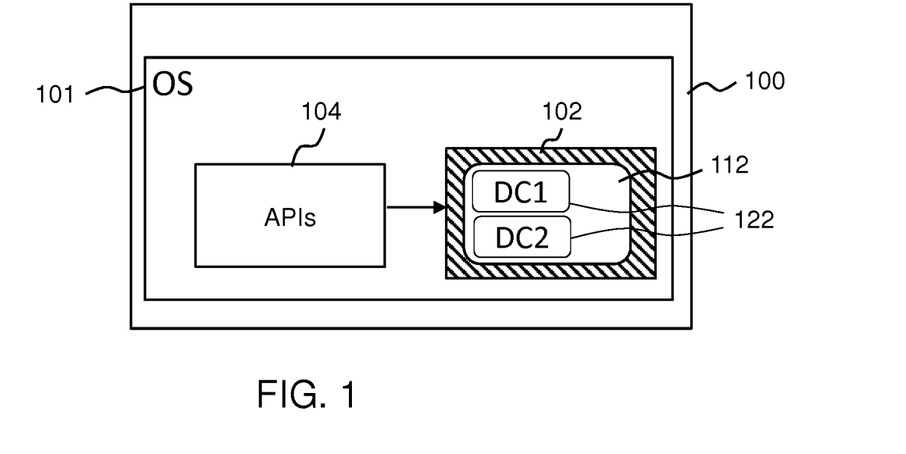
FIG. 1 is a block diagram illustrating a device according to an embodiment.

FIG. 1 schematically illustrates an embodiment of the device 100. The device 100 may be a mobile device, for example a mobile device that has key attestation functionality, or any other device wherein key attestation is useful. FIG. 1 is an illustration of the software features of an operating system (OS) 101 of the device 100. The device 100 comprises a processor and a memory, and the OS 101 is stored in the memory. The OS 101 comprises a secure environment 102 including a trusted application (TA) 112. Two or more device certificates 122, each associated with a device key pair, are also stored in the memory. They are schematically illustrated inside the TA box 112 on FIG. 1, which is meant to show that the device certificates 122 are accessible to the TA 112. More than two device certificates 122 may be stored in the memory. The device key pair bound to the associated device certificate 122 can comprise a public key, and a private key available only to the TA 112. The private key of the device key pair may be stored in the secure environment 102 after being injected into the device or after being generated inside the secure environment 102 during manufacture.

When the OS 101 is run on the processor, the TA 112 is configured to: receive a key pair generation request, generate a key pair in response to the key pair generation request, receive a key pair attestation request with an indication of a preferred device certificate 122, generate an attestation certificate in response to the key pair attestation request, and sign the attestation certificate using one of the two or more device certificates 122 with its associated device key pair based on the indication of the preferred device certificate. The key pair generation and attestation requests may be received together or separately by the TA 112.

The operating system may comprise other applications and application programming interfaces (APIs) 104 used in normal operation of the device. The key pair generation request, as well as the key pair attestation request, may be delivered to the TA 112 via the APIs 104. In an embodiment, the key pair attestation request may be supplemented with an indication of a preferred device certificate 122 by the APIs 104. This can be achieved by configuring the stack of API-s 104 to generate an indication of a preferred device certificate 122, and add this indication to the key pair attestation request before it is received by the TA 112.

Figure 2A:
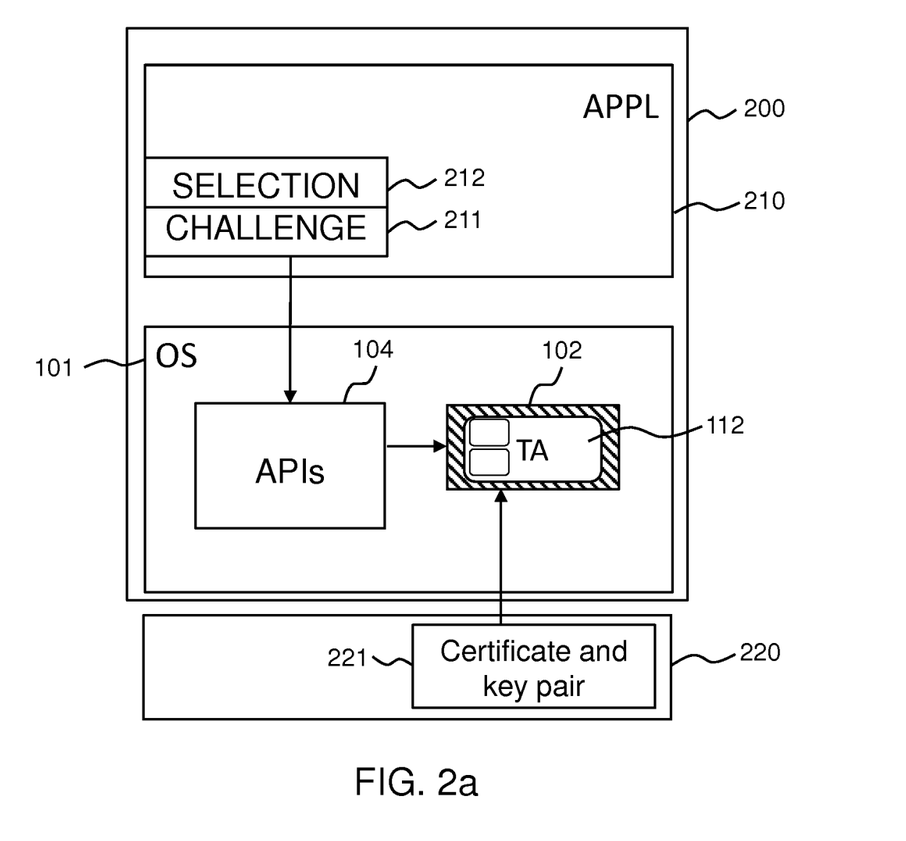
FIG. 2a is a block diagram illustrating a device with an application according to an embodiment.

FIG. 2a illustrates a device 200 according to an embodiment. The device 200 includes a processor and a memory. The device 200 also comprises an OS similar to the OS 101 of FIG. 1, also comprising a secure environment 102 including a trusted application (TA) 112. Two or more device certificates, each associated with a device key pair, are similarly stored in the memory. The device 200 further comprises an application 210 stored in the memory. The application 210 may be any application running on the processor that may request key pair attestation. The application 210 is configured to send to the OS 101 the key pair generation request and the key pair attestation request with an indication of a preferred device certificate. The TA 112 receives the key pair generation request and the attestation request with an indication of a preferred device certificate from the application 210. In the example shown on FIG. 2a, the attestation request also includes a challenge message 211, and the challenge message has a prefix 212 indicating a selection of a preferred device certificate for attestation.

The challenge message 211 with the prefix 212 can flow through the APIs 104 in the application (not shown in the Figures) and in the OS 101 to the TA 112. The TA 112 may be the Keymaster TA if the OS 101 is the Android operating system. When the TA 112 receives the key pair generation request, it can inspect whether the request is accompanied with a challenge parameter in a challenge message 211. If the challenge parameter is present, the TA 112 is configured to initiate the generation of an attestation certificate. During generation of the attestation certificate, TA 112 can also scan the challenge message 211 for a prefix. If a recognized prefix 212 is found, the TA 112 can use this information to select the correct device certificate to sign the attestation certificate.

Figure 2B:
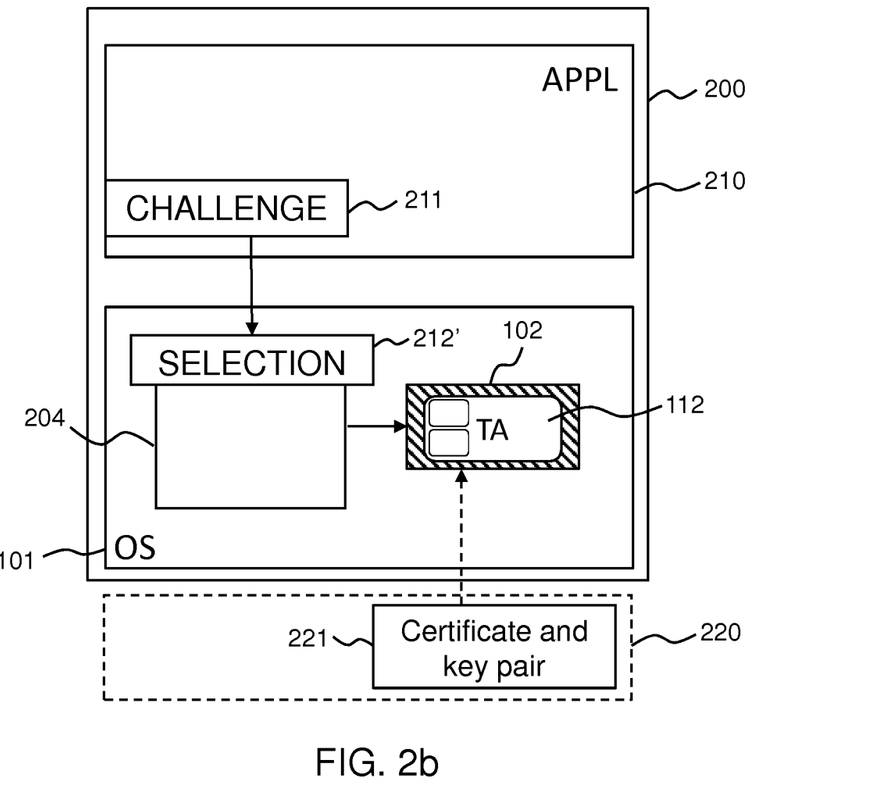
FIG. 2b is a block diagram illustrating a device with an application according to another embodiment.

FIGS. 2a and 2b also schematically illustrate the injection of a device certificate and key pair 221 during manufacture of the device 200. The dashed box 220 schematically illustrates the device manufacturer. The device key pair can be generated in a secure environment like a Hardware Security Module of the manufacturer 220, and a device certificate can be enrolled for this key pair during manufacture from a specific certification authority (CA) that is also operated by the manufacturer 220. The device certificate and the key pair 221 are then securely injected to the device 200 in a device assembly line. In order to make the injection secure, there can be several protection layers to ensure that the private key of the key pair is usable in the secure environment 102 only.

Alternatively to the example embodiment above, the corresponding key pair can be generated in the device 200 during its manufacture inside the secure environment 102, while the device 200 has a secure connection to the CA. The device 200 can then enroll a device certificate directly from the CA using a secure connection. In this alternative, the private key is still only available inside the secure environment 102. The elements 220 and 221 (the certificates and key pairs remain injected in the device) do not relate to normal operation of the device 200 after its manufacture.

FIG. 2b illustrates a device 200 according to a further embodiment. The device 200 includes a processor and a memory. The device 200 of FIG. 2b is similar to the device 200 of FIG. 2a, with the difference that the application 210 is configured to send to the OS 101 a key pair generation request and the key pair attestation request without an indication of a preferred device certificate. The attestation request shown in FIG. 2b also includes a challenge message 211, but the prefix 212' indicating a selection of a preferred device certificate for attestation is added to the challenge message by an application 204 in the OS 101.

The application 204 configured to add the prefix 212' can be set up by a vendor-specific application service onboard the device 200. This service may provide an API to the application 210 requesting key generation to indicate the device certificate. For example, the device according to the embodiment may provide means to set up a device certificate alias: setDeviceCertificateAlias (String alias). The alias in this case would be the same as the prefix 212 in the embodiment shown on FIG. 2a, and is added to the challenge parameter by the vendor specific service. When the TA 112 inspects the challenge, it may remove the prefix 212' from the challenge before it is included in further extensions.

In this embodiment, the usage of the prefix 212' may be visible to external applications.

The challenge message 211 as shown in FIGS. 2a and 2b may also include a cryptographic hash function or a message authentication code (MAC) confirming that the challenge message 211 has a prefix 212, 212' indicating a preferred device certificate. Format of the prefix indication can be a simple string like "vendor", or more complex like a Type Length Value (TLV) parameter, where the value could be either a simple string or a more complex value. In order to detect that a prefix is present intentionally in the challenge 211, the challenge 211 may include a MAC or hash function at the end of the challenge 211. This way the detection of "false positives" is enabled. In this case, the entity adding a prefix 212, 212' to the challenge 211, is also configured to add a postfix that contains a MAC or a hash function. For instance, a hash-based challenge can be calculated as follows:

challenge_new=prefix|challenge|HASH (prefix|challenge)

When the TA 112 inspects this challenge_new parameter and detects that the prefix 212, 212' is present, it will also check that the hash or MAC is present in the challenge 211 to verify that the prefix 212, 212' is intentional and then proceeds with the device certificate selection. If the HASH or MAC is not present, the TA 112 can use the default device certificate to sign the attestation certificate. In an embodiment where the prefix 212' and the HASH or MAC are added by the vendor-specific service onboard the device, the TA 112 can in turn remove the prefix 212' and the HASH or MAC, extracting the original challenge 211.

The prefix 212, 212' is associated with the device certificate at that time. For instance, when importing a vendor-specific device certificate, the prefix could be "vendor" or the name of the vendor. The prefix could also be any arbitrary octet data, including TLV parameters. The TA 112 may be configured to treat it as arbitrary octet data checked to be part of the challenge. There may be also multiple prefixes to indicate one device certificate. For instance, the vendor-specific device certificate could be indicated both with the "vendor" prefix and a vendor name itself (for instance "huawei").

Figure 3:
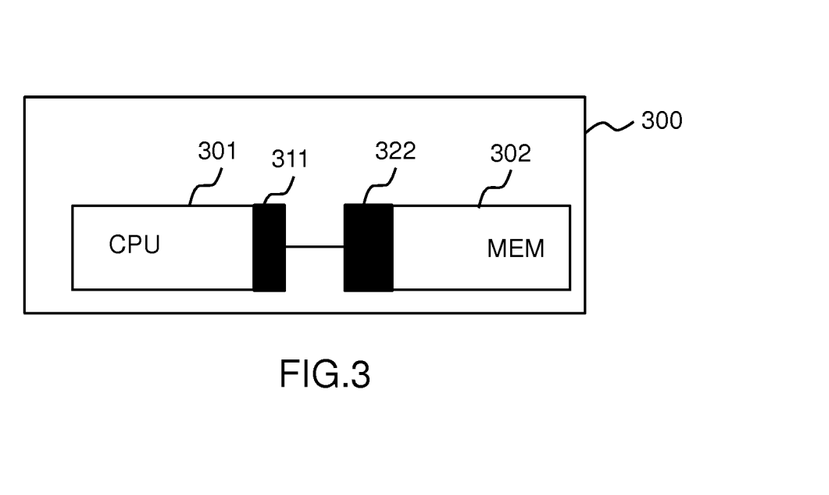
FIG. 3 is a block diagram illustrating the device hardware.

FIG. 3 illustrates a device 300 according an embodiment from a hardware perspective. The device 300 may be a device according to any of the embodiments described above, for example a device shown in one of FIGS. 1, 2a, 2b. The device 300 comprises a processor 301 and a memory 302. The memory 302 comprises a secure segment 322 accessible only to the trusted application. In an embodiment, the private key of the device key pair is stored in the secure segment 322 of the memory 302.

The processor 301 in the embodiment is operable in a secure mode. When the operating system is run on the processor, the operating system is configured to initiate the secure mode of the processor and execute the trusted application to generate and sign the attestation certificate. The processor 301 may also comprise a secure area 311 such as a trusted execution environment (TEE), configured to isolate and protect data loaded into it. The secure area 311 may be activated when the processor 301 is run in the secure mode initiated by the trusted application.

Figure 4:
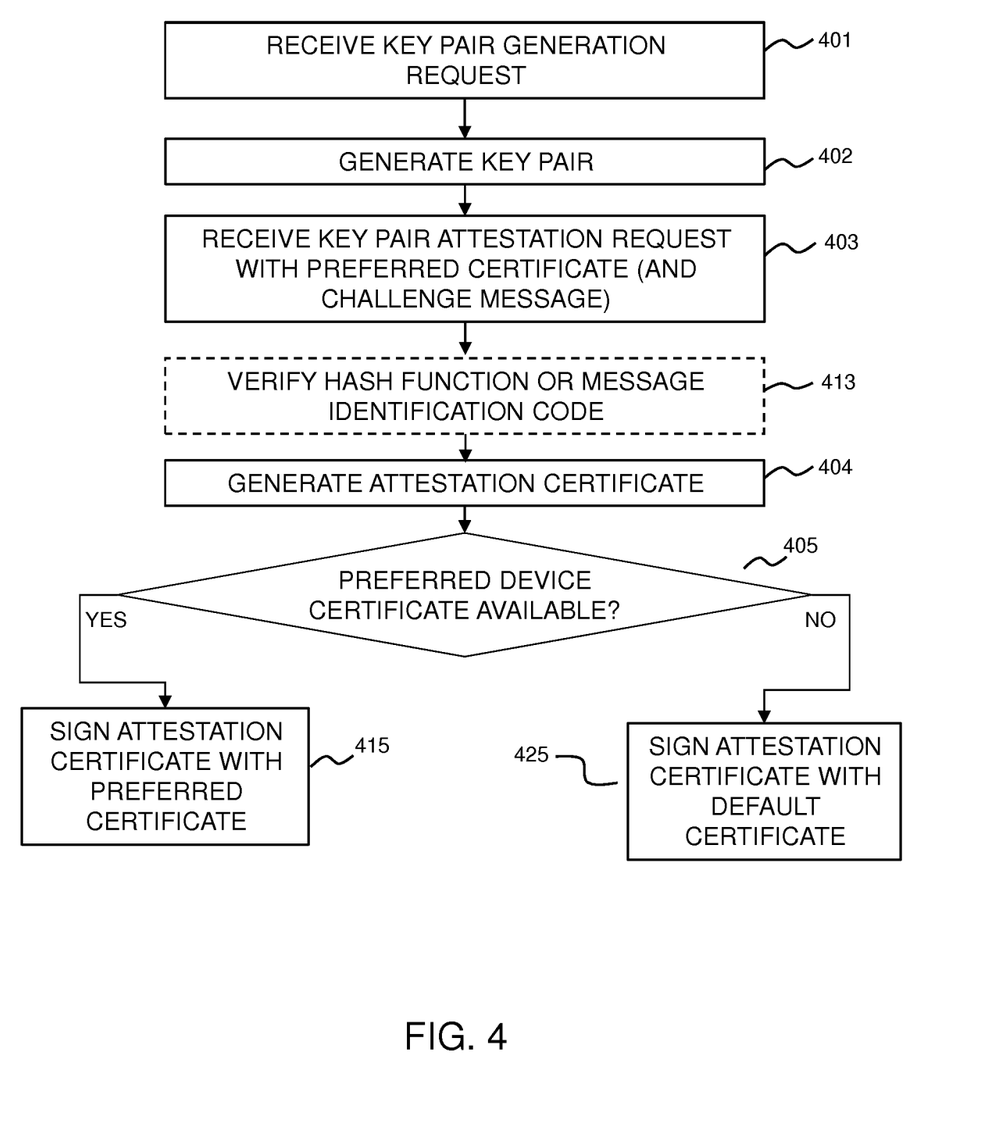
FIG. 4 is a flow chart illustrating a method according to an embodiment.

FIG. 4 is a flow chart of a method of attestation of a key pair by a trusted application stored in a secure environment of an operating system. The operating system comprising the trusted application may be run on a device, such as the devices described in relation to FIGS. 1-3.

The method includes receiving 401 a key pair generation request, and generating 402 a key pair in response to the key pair generation request. The key pair generation request may be received by the trusted application from an external application, or from an application comprised in the operating system. The method further comprises receiving 403 a key pair attestation request with an indication of a preferred device certificate, and generating 404 an attestation certificate in response to the key pair attestation request. The method may include receiving a challenge message as part of the key pair attestation request, wherein the challenge message includes a prefix indicating a preferred device certificate.

The attestation certificate needs to be signed with a device certificate, and so the method also comprises checking 405 the availability of the preferred device certificate. If the preferred device certificate is available, the attestation certificate is signed at 415 using the preferred device certificate with its associated device key pair. If the preferred device certificate is unavailable, the method continues with signing 425 the attestation certificate using a default device certificate with its associated device key pair.

In an example embodiment, the challenge message also includes a cryptographic hash function or a message authentication code confirming that the challenge message has a prefix indicating a preferred device certificate. Thus the method may comprise an optional step of verifying 413 the cryptographic hash function or the message authentication code. If the verification is unsuccessful, the method may include directly signing the attestation certificate using a default device certificate with its associated device key pair.

In an embodiment, the method may also comprise initiating a secure mode of operation prior to generating the attestation certificate. The secure mode of operation may be a secure mode of the central processor.

In an example embodiment, the method may also comprise sending the signed attestation certificate and the device certificate back to the requesting application. These certificates may be sent back to the application separately or together in a certificate chain.

Figure 5:
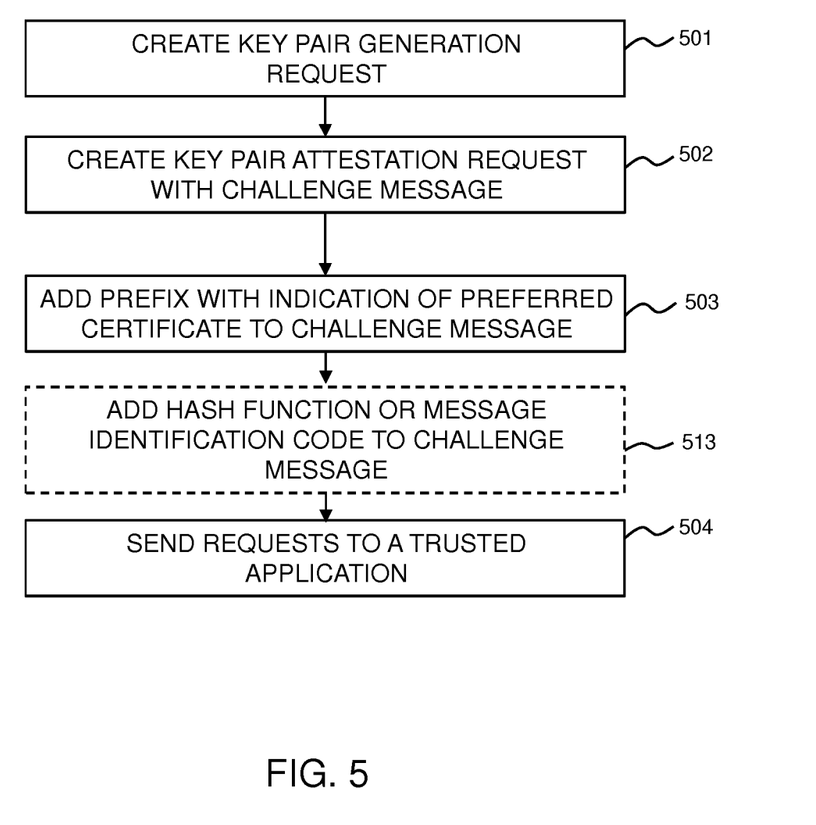
FIG. 5 is a flow chart illustrating another method according to an embodiment.

FIG. 5 illustrates a method of indicating a preferred device certificate by an application. The application carrying out this selection-related method may be for example the application 210 according to the embodiments illustrated by FIG. 2a.

The method comprises creating 501 a key pair generation request, creating 502 a key pair attestation request comprising a challenge message, then adding 503 a prefix to the challenge message. The prefix comprises an indication of a preferred device certificate. In an alternative method, the prefix may be added later on by an application running within the operating system.

The method further comprises sending 504 the key pair generation request together with the key pair attestation request to a trusted application stored in a secure environment of an operating system. The method may comprise an optional step of adding to the challenge message a cryptographic hash function or a message authentication code confirming that the challenge message has a prefix comprising an indication of a preferred device certificate, which is carried out before sending 504 the requests.

Furthermore, an apparatus configured to perform the method shown in FIG. 5 is disclosed.

The functionality described herein can be performed, at least in part, by one or more computer program product components such as software components. According to an embodiment, the system 100 comprises a processor configured by program code to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising:
  a memory configured to store an operating system, wherein the operating system comprises a secure environment comprising a trusted application and at least two device certificates, and wherein each of the at least two device certificates is associated with a device key pair enrolled to the device during manufacturing and stored in the memory; and
  a processor coupled to the memory and configured to run the operating system to:
    receive a key pair generation request;
    generate a key pair in response to the key pair generation request;

receive a key pair attestation request with an indication of a first device certificate;

generate an attestation certificate in response to the key pair attestation request; and sign the attestation certificate using one of the at least two device certificates with a corresponding device key pair based on the indication of the first device certificate.

2. The device of claim 1, wherein the memory is further configured to store an application, wherein the application is configured to send, to the operating system, the key pair generation request and the key pair attestation request, and wherein the trusted application is configured to receive the key pair generation request and the key pair attestation request from the application.

3. The device of claim 2, wherein the key pair attestation request comprises a challenge message, and wherein the challenge message comprises a prefix indicating the first device certificate.

4. The device of claim 2, wherein the key pair attestation request comprises a challenge message, and wherein the operating system further comprises another application configured to add a prefix indicating the first device certificate to the challenge message.

5. The device of claim 3, wherein the challenge message further comprises a cryptographic hash function confirming that the challenge message comprises the prefix, and wherein the trusted application is further configured to:

verify the cryptographic hash function; and sign the attestation certificate using the one of the at least two device certificates with the corresponding device key pair based on the prefix when the verification is successful.

6. The device of claim 1, further comprising a stack of application programming interfaces (APIs) configured to:

generate the indication of the first device certificate; and add the indication to the key pair attestation request before sending the key pair attestation request to the trusted application.

7. The device of claim 1, wherein the corresponding device key pair comprises a public key bound to the device certificate and a private key of the trusted application.

8. The device of claim 7, wherein the memory comprises a secure segment that is accessible by the trusted application, and wherein the secure segment is configured to store the private key.

9. The device of claim 1, wherein the processor is configured to operate in a secure mode, and wherein the operating system is configured to:

initiate the secure mode; and execute the trusted application to generate and sign the attestation certificate.

10. The device of claim 1, wherein each of the at least two device certificates comprises vendor specific certificates, operating system specific certificates, a default certificate or a generic vendor certificate.

11. The device of claim 1, wherein the operating system is a mobile operating system based on a LINUX kernel.

12. The device of claim 3, wherein the challenge message further comprises a message authentication code confirming that the challenge message comprises the prefix, and wherein, when the processor runs the operating system, the trusted application is further configured to:

verify the message authentication code; and sign the attestation certificate using the one of the at least two device certificates with the corresponding device key pair based on the prefix when the verification is successful.

13. A method of attestation of a key pair implemented by a trusted application stored in a secure environment of an operating system, comprising:

receiving a key pair generation request;

generating the key pair in response to the key pair generation request;

receiving a key pair attestation request with an indication of a first device certificate, wherein the device certificate is enrolled to a device during manufacturing;

generating an attestation certificate in response to the key pair attestation request;

checking availability of the first device certificate;

signing the attestation certificate using the first device certificate with a corresponding device key pair when the first device certificate is available; and signing the attestation certificate using a default device certificate with a second corresponding device key pair when the device certificate is unavailable.

14. The method of claim 13, further comprising receiving a challenge message with the key pair attestation request, wherein the challenge message comprises a prefix indicating the first device certificate.

15. The method of claim 14, wherein the challenge message further comprises a cryptographic hash function confirming that the challenge message comprises the prefix, and wherein the method further comprises:

verifying the cryptographic hash function;

checking availability of the first device certificate indicated in the prefix when the verification is successful; and signing the attestation certificate using the default device certificate with the second corresponding device key pair when the verification is unsuccessful.

16. The method of claim 13, further comprising initiating a secure mode of operation prior to generating the attestation certificate.

17. The method of claim 14, wherein the challenge message further comprises a message authentication code confirming that the challenge message comprises the prefix, and wherein the method further comprises:

verifying the message authentication code;

checking availability of the device certificate indicated in the prefix when the verification is successful; and signing the attestation certificate using the default device certificate with the second corresponding device key pair when the verification is unsuccessful.

18. A computer program product comprising computer-executable instructions for storage on a non-transitory computer-readable medium that, when executed by a processor, cause a device to:

receive a key pair generation request;

generate a key pair in response to the key pair generation request;

receive a key pair attestation request with an indication of a device certificate, wherein the device certificate is enrolled to the device during manufacturing;

generate an attestation certificate in response to the key pair attestation request;

check availability of the device certificate;

sign the attestation certificate using the device certificate with a corresponding device key pair when the device certificate is available; and sign the attestation certificate using a default device certificate with a second corresponding device key pair when the device certificate is unavailable.

19. The computer program product of claim 18, wherein the computer-executable instructions further cause the device to receive a challenge message with the key pair attestation request, and wherein the challenge message comprises a prefix indicating the device certificate.

20. The computer program product of claim 18, wherein the computer-executable instructions further cause the device to initiate a secure mode of operation prior to generating the attestation certificate.

* * * * *